April 28, 1970 J. H. KING 3,509,297

TEST CONNECTOR

Filed July 15, 1968 5 Sheets-Sheet 1

INVENTOR
J.H. KING
BY Leo Stanger
ATTORNEY

April 28, 1970 J. H. KING 3,509,297

TEST CONNECTOR

Filed July 15, 1968 5 Sheets-Sheet 3

United States Patent Office 3,509,297
Patented Apr. 28, 1970

3,509,297
TEST CONNECTOR

John H. King, Chatham, N.J., assignor to Bell Telephone Laboratories, Incorporated, Murray Hill, N.J., a corporation of New York Filed July 15, 1968, Ser. No. 744,997
Int. Cl. H01r *33/30*
U.S. Cl. 200—51 18 Claims

ABSTRACT OF THE DISCLOSURE

A test connector joins fifty spring-wire connections on a telephone central office frame to a test set by contacting them with respective contact members that are each movable into three positions. In the first position, a pawl holds a contact member back against the force of a spring and out of contact with the spring-wire connections. Withdrawing the pawl partly allows the spring to move the contact member into a second position in which the member contacts one spring-wire connection and joins it to the test set. Withdrawing the pawl fully allows the spring to push the contact enough to break the spring-wire connection while maintaining contact with one spring wire. A movable plate common to all pawls selectively defines the degree to which the pawls can be withdrawn.

BACKGROUND OF THE INVENTION

This invention relates to electrical connectors particularly for selective connecting test circuits to the large number of electrical conductors that arrive at the switching system of a telephone central office.

Such conductors generally end at test junctions which are arranged in columns on central office frames. The junctions take the form of pairs of engaged but disengagable switch contacts. The incoming conductors arrive at one of the contacts of a pair. Suitable leads connect the other contact to the telephone central office network. In order to test the incoming conductors efficiently, it is necessary to select particular conductors and rapidly make and break connections with the contacts at which the conductors end. Some test connectors for this purpose include means for connecting test leads to the contacts of the conductors tested. Since the contacts are generally arranged in long columns close to each other, use of such individual connecting means can result in mistakes so that the test circuit may be accidentally connected to the wrong contacts and hence the wrong conductors or may be accidentally connected to two or more contacts at one time. In any case, such testing is slow and laborious.

In Patent No. 3,275,971 some of these difficulties are avoided by aligning a pedestal opposite a plurality of such exposed disengagable contacts and by depressing a number of aligned plungers which pivot test connectors against appropriate contacts so that leads from the connectors can connect the contacts to appropriate test equipment. Such a connector as well as others previously used are limited in their ability to control the condition of the contacts being tested, that is, they are unable to connect and disconnect the contacts. Often tests on closed or connected contacts are inconclusive and require that the contacts be disconnected or open. To do this with earlier test connectors it was necessary to locate the proper switch contacts and open them. Mistakes might occur. It also added another laborious task to the job of testing large numbers of switch contacts.

THE INVENTION

According to a feature of the invention the disadvantages of such previous test connectors are obviated, by aligning on a platform a plurality of contact or assemblies for travel toward the switch contacts and releasably locking them in one of three positions. Each assembly has a conductive portion connected to a test circuit and a non-conductive portion. In the first position, no connection is made with the switch contacts. In the second position, the assembly advances toward the switch contacts only enough to make a connection thereto. In the third position, each assembly advances far enough for the insulating portion of the assembly to separate one switch contact from the other so as to break the connection between them. In the third position this disconnects the conductors from the central office network.

According to another feature of the invention, spring means drive the separate assemblies from the first through the second position and to the third position. Locking means biased toward a plunger which guides each assembly engages steps in the surface of the plunger to stop it in the desired position. A movable control bar common to all the locking means may be positioned to allow the locking means to release the plunger only to the first or second positions.

According to still another feature of the invention the locking means include a pawl that grasps onto the steps on the plunger advancing the contact assembly. The contact assembly at its insulating portion includes a cam surface that lifts one contact member away from the other.

These and other features of the invention are pointed out in the claims. Other objects and advantages of the invention will become obvious from the following detailed description of the invention when read in light of the accompanying drawings.

DESCRIPTION OF PREFERRED EMBODIMENTS

Figure 1:
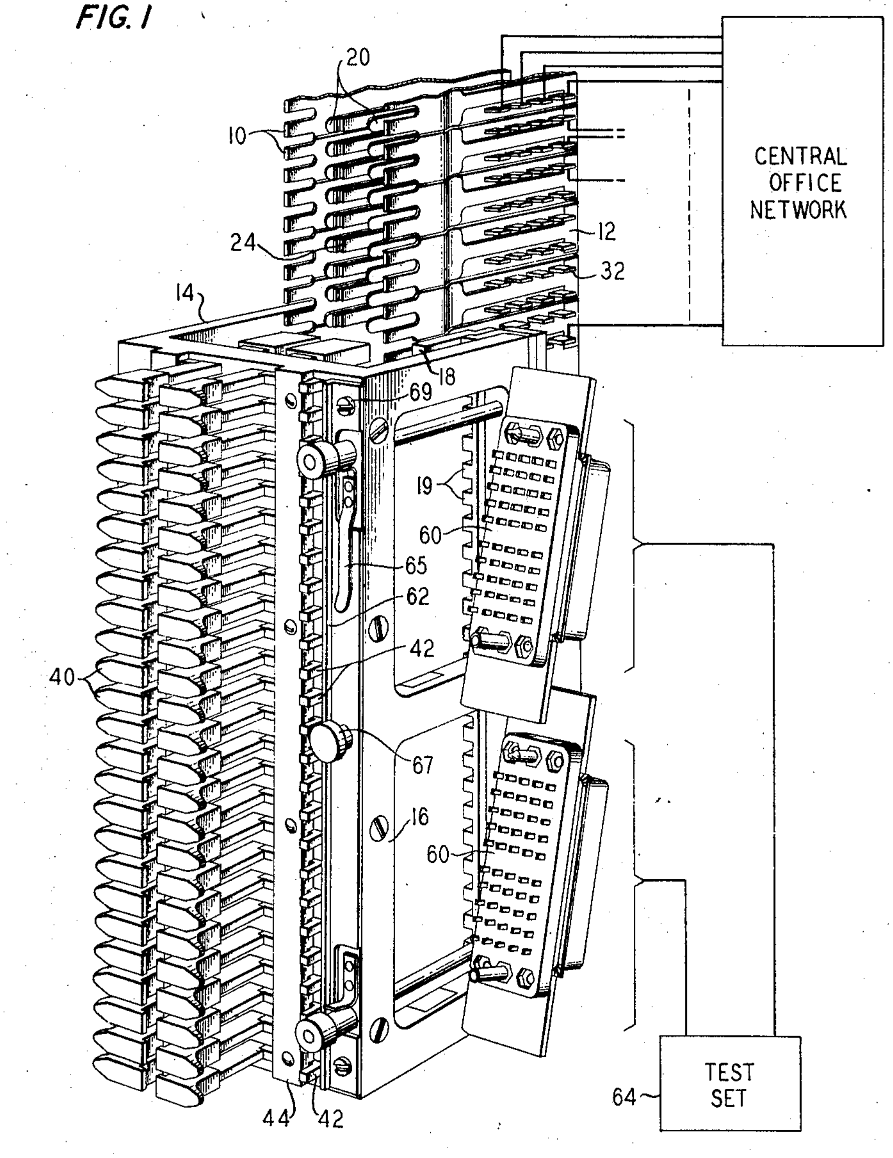
FIG. 1 is a perspective view of a connector embodying features of the invention and mounted on the main frame of a central office while being connected to suitable testing circuits.
Figure 2:
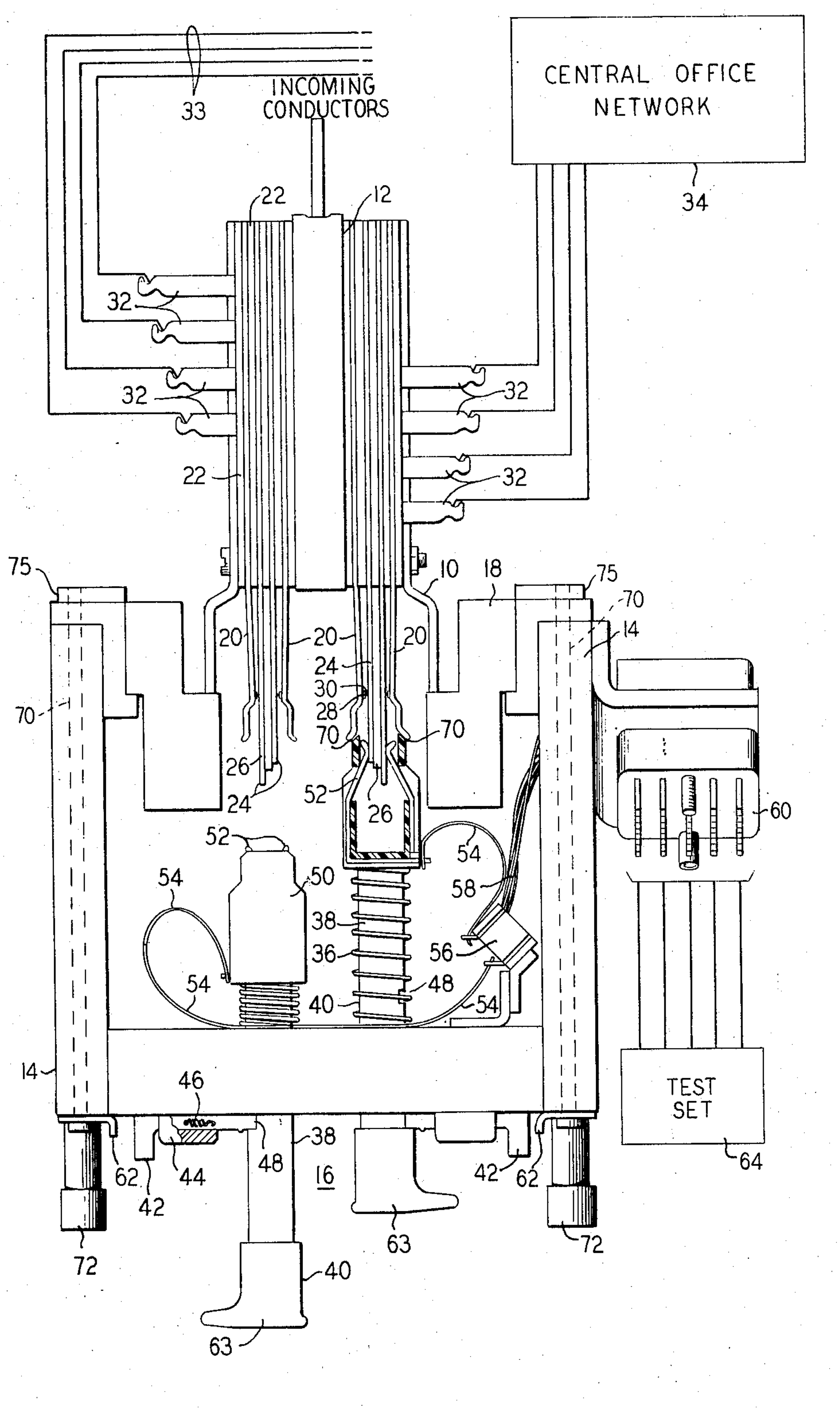
FIG. 2 is a partly schematic section 2—2 of FIG. 1 illustrating the plungers locked in two of the three positions.

In FIGS. 1 and 2, a plurality of horizontal fingers 10 on the frame 12 of a telephone central office support the U-shaped plastic pedestal 14 of a test connector 16. Connector-supporting blocks 18 resiliently holding the fingers 10 grasp suitable furrows 19, which appear most clearly in FIG. 3, on the inside of the pedestal 14 to hold the connector 16 in position. A plurality of movable resilient contact leaves 20 projecting outwardly from insulating laminae 22 on the frame 12 are biased resiliently toward flat stationary conductive reeds 24, also held by the laminae 22. Rigid insulating strips 26 projecting beyond the remaining laminae 22 between adjacent stationary reeds 24 maintain the rigidity of the reeds and space them from each other throughout their mutual lengths. The shape of the leaves 20 and the force of the laminae 22 bias them so that contact members 28 near the ends of the leaves contact mating contact members 30 on the reeds 24. The reeds 24 are arranged by the laminae 22 and insulating strip 26 in back-to-back relation in two sets along a horizontal plane so as to form with inwardly biased laves 20 four contact sets in the same plane. In each horizontal plane of the frame 12, the fingers 10 are secured to the respective outsides of the four contact sets. Eight terminals 32 in each horizontal plane join the conductive reeds 24 to incoming conductors 33 and leaves 20 to the central office network 34. Each leaf 20 and its accompanying reed closes a circuit on the network 34 by means of the contacts 28 and 30.

Figure 3:
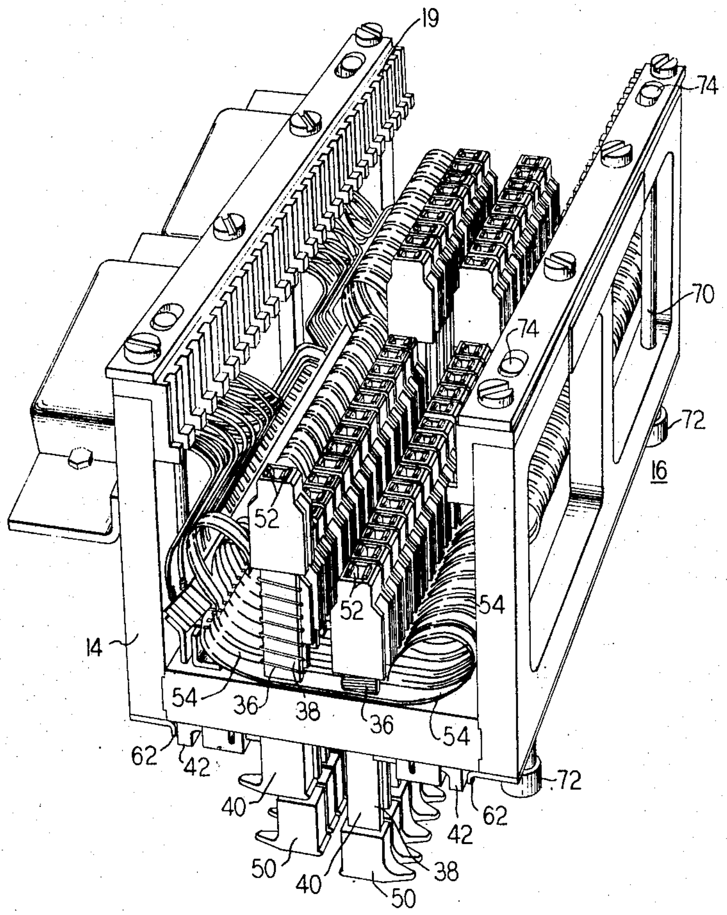
FIG. 3 is a perspective view illustrating the rear side of the connector in FIG. 1.

On the connector 16, shown in FIGS. 1, 2 and 3 respective coil springs 36 surrounding the blades 38 of respective horizontally disposed test plungers 40 drive the plungers or bias the plungers toward the leaves 20 and reed 24. In their quiescent positions the plungers are withdrawn against the bias force of the springs 36 into the position shown for the left-hand plunger 40 of FIG. 2 where a pawl 42 slidably held by a plate 44 and biased by a spring 46 holds them by entering a notch 48 in the blade 38. On the plungers a plastic head 50 encloses two inwardly biased contact fins 52. Wiring, printed on flexible ribbons 54, connects the fins 52 to a terminal board 56. There suitable wires 58 join the printed wiring at the terminal board 56 to a male connector plug 60. Behind the aligned sets of pawls 42 a pair of elongated stop members 62 at each edge of the U-shaped channel 14 control the degree to which the pawls 42 may be withdrawn. When a pawl 42 is withdrawn against the stop member 62, it releases the plunger 40 by moving out of the notch 48. The spring 36 advances the thus released plunger 40 until the top of a gripping shoe 63 at the end of plunger 40 rests against the pawl 42 as shown by the right-hand plunger in FIG. 2. In that position the contact fins 52 press inwardly against the respective reeds 24 on two sets of contact members.

Each of the ribbons 54 carries two flexible printed wires. Each of the fins 52 in one head 50 is connected by one of the printed wires to one wire 58 going to one prong of the male connector 60.

In the position shown for the right side of FIG. 2 when a suitable test set 64 is connected to one of the connectors, fifty tests can be made on the circuits which the conductive reeds 24 join through the terminals 32 in the network 34 while the leaves 20 are connected to the rods through the contact members 28 and 30.

Figure 4:
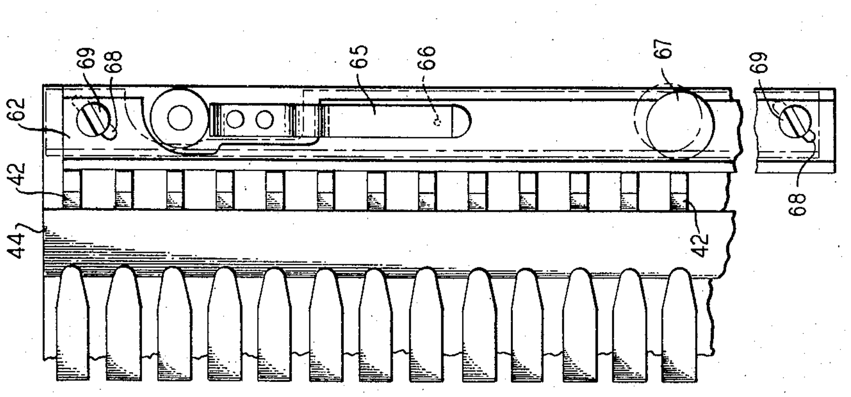
FIG. 4 is an elevation illustrating the mechanism for shifting the operation of the connector in FIG. 1 according to the invention.

The angle forming the elongated stop member 62 on each side of the connector 16 is held in its position by a leaf spring 65 mounted at one end on the pedestal 14. The spring, at its other end, has a stud 66 that enters a recess (not shown) in the stop member 62. By lifting the stud 66 out of the recess, the stop member may be moved angularly with a knob 67 from the position shown in solid lines in FIG. 4 along a path determined by a pair of slots 68. The stop member 62 then slides relative to bolts 69 mounted on the U-shaped pedestal of the connector 16 to the position shown by broken lines in FIG. 4.

Figure 5:
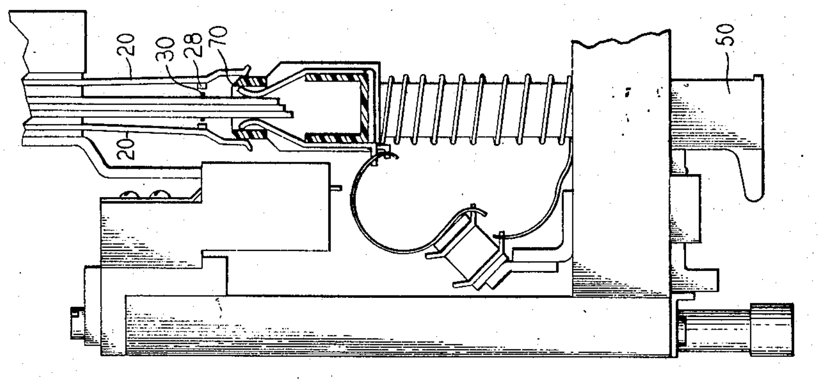
FIG. 5 is another view of FIG. 2 illustrating one of the plungers in a third position.

When the stop member 62 is retracted to the position of the broken lines, the pawls 42 may be withdrawn even further. Then, the springs 36 drive the plunger 40 until the shoes 63 rest against pedestal 14, as shown for the position of the plunger in FIG. 5. At that position the cam surfaces 70 on the heads 50 of the plungers 40 spread the leaves 20 outwardly and break the contact between the contact members 30 and 28. In these positions the circuits in the network 34 connected to the reeds 24 are tested while they are unconnected from the circuits connected to the leaves 20. Such tests are often vital for determining the adequacy of circuitry in telephone systems.

In operation, before the test connector is mounted the gripping shoes 63 are pulled outwardly so as to pull the plungers 40 against the biasing force of the springs 36 until the springs 46 move the pawls 42 into the respective notches 48 of the plungers. This is to make sure that when the connector 16 is mounted, no contact is made between the fins 52 and the reeds 24. The stop members 62 are then moved into their inward position by lifting the spring 65 and moving the members by means of the knobs 67 to their inboard positions.

Figure 6:
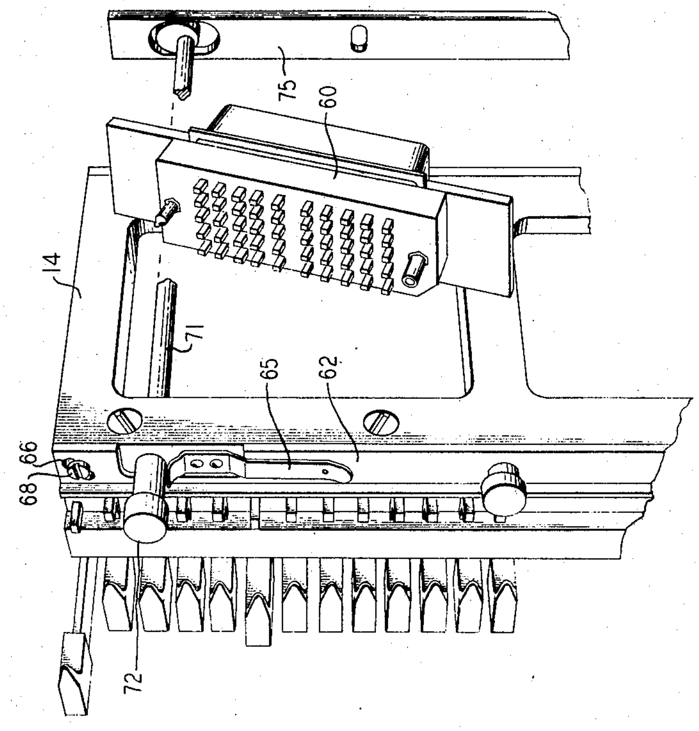
FIGS. 6, 7 and 8 are perspective and exploded details of means for mounting the connector of FIG. 1 onto the frame of a central office according to the invention.
Figure 8:
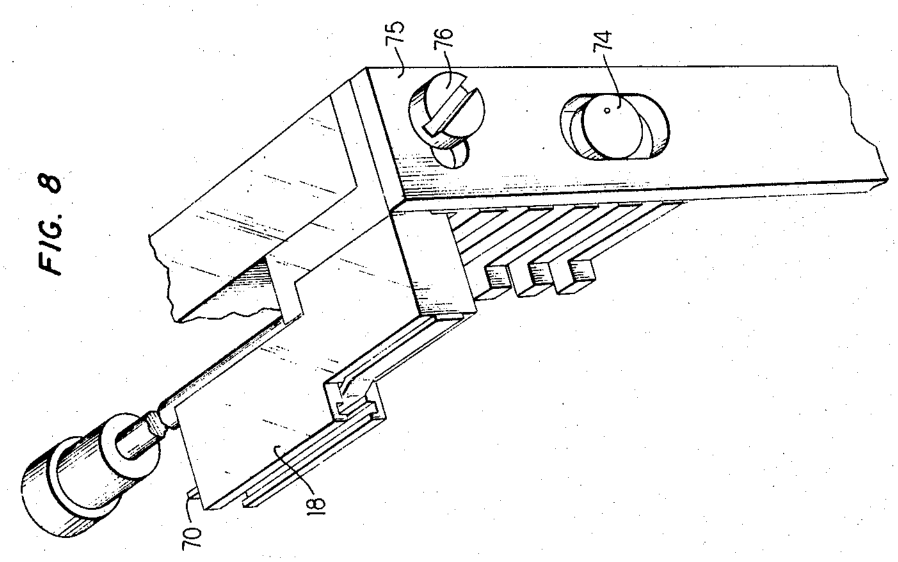
Figure 7:
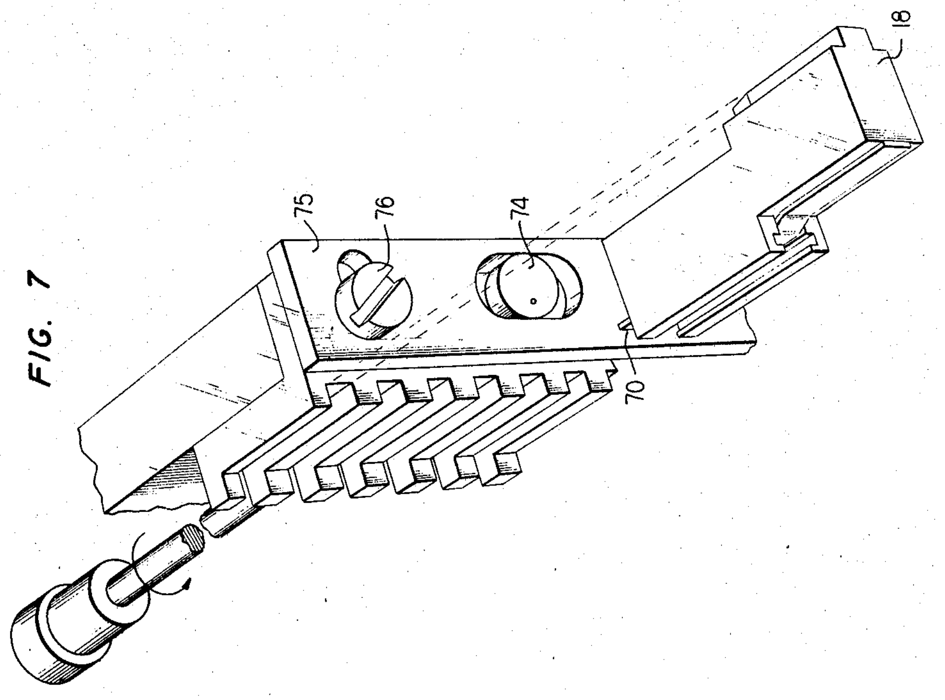

An operator mounts the test connector 16 upon the frame 12 by attaching the blocks 18 to the fingers 10 and then sliding the horizontal furrows 19 on the test connector 16 onto the blocks 18. To secure the connector 16 on the fingers 10, the operator turns four shafts 71 by means of their knurled ends 72. These are shown more clearly in FIGS. 3 and 6. At the ends of the U-shaped pedestal eccentric cams 74 mounted on the shafts 71 move two locking plates 75 that are slidably mounted on the pedestal by screws 76, from the outward position shown in the left hand of FIG. 3 to the inward position shown in the right hand of FIG. 3. The shafts 71 and the associated plate 75 are shown in more detail in FIG. 6. FIGS. 7 and 8 show the plate 75 in its open and locking positons. Spring-operated catches 78 having tips 80 grasp the fingers 10 to hold the blocks 18 onto the fingers.

The test set 64 is connected to the correct male connectors by suitable lines, and testing begins. While the elongated stop member 62 is maintained in its inboard position shown in full lines in FIG. 4, the pawls 42 are withdrawn against it, and the plungers 40 are forced by the springs 36 into the positions shown in the right hand of FIG. 2. Suitable tests are then made by the test set 64. When all tests have been made, the stop members 62 on both sides of the pedestal 14 are then moved outwardly, by lifting the studs 66, to the position shown in phantom lines in FIG. 4. The pawls 42 are then pulled out further to allow the springs 36 to move the plungers 40 into the positions shown in FIG. 4. The operator may run his hands across the shoes 63 to push them in and assure proper contact where necessary. Then new tests are made with the test connectors contacting only the reeds 24 and to the circuits connected therewith. The circuits connected only to the leaves 20 are then removed out of the test apparatus. The test set 64 may then compare the tests between the conditions occurring while the circuits associated with the leaves are connected to the circuits associated with the reeds and while the circuits associated with the leaves are disconnected from the circuits associated with the reeds.

The apparatus affords a simple method of mounting a test set and connecting it to large numbers of wires in a complex telephone central office system and permits rapid testing thereof while, at the same time, making certain that tests are conducted with open and closed leaves and reeds.

While an embodiment of the invention has been described in detail, it will be obvious to those skilled in the art that the invention may be practiced otherwise without departing from its spirit and scope.

What is claimed is:

1. A test apparatus for testing a plurality of contacting pairs of conductors on a frame, comprising platform means securable to said frame, a plurality of contact means slidably mounted on said platform, guiding means for guiding each of said contact means individually into three positions, said contact means each remaining out of engagement with said conductors in the first of said positions, said contact means each contacting one of said conductors in said second position and third positions of each of said contact means, said contact means having an insulating portion engaging one of said conductors in said third position for breaking contact between pairs during movement from said second to said third position and for maintaining said break in the third position.

2. A test apparatus as in claim 1 wherein said guiding means include spring means for biasing each of said contact means toward one of said positions and restraining means for engaging said contact means and selectively holding them in one of said other positions and releasing them from said positions.

3. A test apparatus as in claim 2 wherein said restraining means each include resilient means for stopping said contact means in one position and partly and fully retractable handle means for releasing said contact means for movement into one other when retracted partially and for releasing said contact means to a third position when retracted fully.

4. A test apparatus as in claim 2 wherein said guiding means include control means for limiting the releasing action of said restraining means and allowing said restraining means to release said contact means only enough to release said contact means to move to one of the other two positions.

5. A test apparatus as in claim 3 wherein said guiding means include control means for limiting the movement of said handle means to a position wherein each of said contact means are released only enough to travel to one of the other positions.

6. A test apparatus as in claim 4 wherein said control means are common to all of said restraining means.

7. A test apparatus as in claim 4 wherein said control means are common to all of said handle means.

8. A test apparatus as in claim 1 wherein said insulating portion of each of said contact means includes a cam surface for moving one of said conductors in each pair away from the other.

9. A test apparatus as in claim 1 wherein said guiding means include push rod for each of said contact means and slidable relative to said platform.

10. A test apparatus as in claim 2 wherein said guiding means include a push rod for each contact means, said rods being slidable relative to said platform.

11. A test apparatus as in claim 10 wherein said rods each include two ridges one for each of two of said positions, one of said ridges extending out of the line of movement of said rod further than the other.

12. A test apparatus as in claim 11 wherein said restraining means include a pawl for each rod and resilient means for moving said pawl in the path of said ridges, said springy means moving said contact means so said ridge which extends out of the line of movement of said rod less than the other encounters said pawl first.

13. A test apparatus as in claim 12 wherein a movable two-station angle allows said each of said pawls to retract only enough to release one of said ridges but catch the other in one station and to move back far enough to allow said pawl to retract enough to release both of said ridges.

14. A test apparatus as in claim 13 wherein said angle is common to each of said pawls and controls them all simultaneously.

15. A test apparatus as in claim 2 wherein each of said spring means bias each of said contact means successively from said first position to said second and said third position.

16. A test apparatus as in claim 1 wherein said contact means are in alignment.

17. A test connector as in claim 1 wherein block means are secured onto said frame and allow said pedestal to slide onto said frame, and wherein plate means movably transverse to the movement of said pedestal onto the frame secure said pedestal onto said block means.

18. A test connector as in claim 17 wherein cam means having hand-turnable shafts projecting from said pedestal move said plates.

References Cited

UNITED STATES PATENTS

| | | | |
|---|---|---|---|
| 2,104,434 | 1/1938 | McCormick et al. | 179—96 |
| 2,227,967 | 1/1941 | Favre. | |
| 3,002,170 | 9/1961 | Clouthier | 200—163 |
| 3,178,670 | 4/1965 | Paniel et al. | 200—163 |

ROBERT K. SCHAEFER, Primary Examiner

D. SMITH, Jr., Assistant Examiner

U.S. Cl. X.R.

179—96; 200—16, 51.1, 163